Nov. 24, 1970  W. S. LINFIELD  3,543,093
POWER SUPPLY MONITOR
Filed April 7, 1967
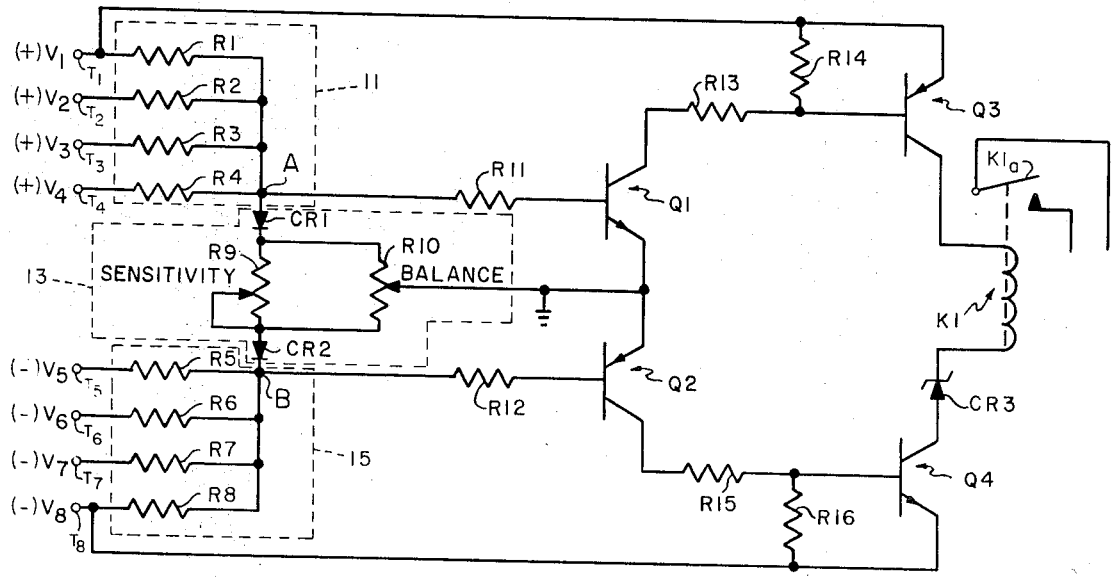
Fig. 1
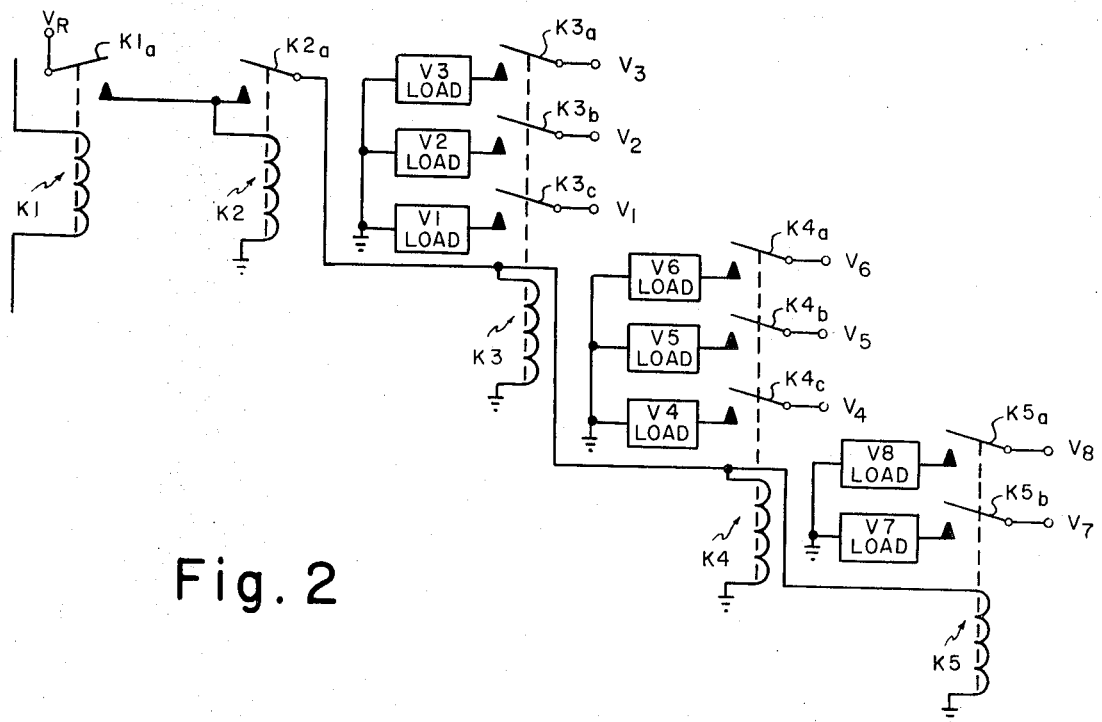
Fig. 2
Wayne S. Linfield
INVENTOR
ATTORNEY

United States Patent Office 3,543,093
Patented Nov. 24, 1970

3,543,093
POWER SUPPLY MONITOR
Wayne S. Linfield, Sparks, Md., assignor to AAI Corporation, Cockeysville, Md., a corporation of Maryland
Filed Apr. 7, 1967, Ser. No. 629,324
Int. Cl. H02h 3/20, 3/36
U.S. Cl. 317—31        22 Claims

ABSTRACT OF THE DISCLOSURE

A single circuit power supply monitor is disclosed for continuously monitoring all of a selected plurality of DC voltage sources. The monitor circuit includes two oppositely biased primary electron control devices, in the form of opposite conductivity type transistors, each normally biased slightly into conduction at the desired voltage level for all of the monitored power supplies. Each of these two primary electron control devices in turn controls the current flow through a respective one of a further two normally fully conducting electron control devices in the form of two opposite conductivity type transistors, which are serially connected with and at opposite ends of an electron flow responsive indicating and/or actuating device, taking the form of a power cut-off relay and/or an indicator lamp, buzzer, or the like. A threshold voltage limiting control device in the form of a Zener diode is also preferably connected in series with and between the current responsive device to achieve clean cut-in and cut-out.

---

This invention relates to a power supply monitor, and more particularly to a monitor arrangement adapted to monitoring a plurality of DC voltage sources, the arrangement being selectively effective to give an indication of undesired voltage variation and/or to disconnect the monitored voltage sources from their respective loads.

In various selective equipment arrangements it is necessary to provide a plurality of different voltage sources of various voltage levels, often of both positive and negative potential. It is desirable to monitor these voltage sources in many instances in order to prevent equipment damage upon variation of the voltage outside of a permissible tolerance range. Such monitoring is conventionally accomplished through the medium of corresponding individual voltage monitoring devices, which is of course satisfactory from an operational standpoint, but is expensive and adds further equipment to the system. It is desirable to monitor the various voltage sources with a single monitoring arrangement which is simple, reliable and inexpensive. It is also desirable that this monitoring arrangement be capable of accommodating both positive and negative DC voltage sources. It is accordingly a major feature and advantage of the present invention to provide a power supply monitor arrangement in the form of a single common monitoring circuit for a plurality of DC voltage sources, and which is capable of monitoring a set of positive potential sources, a set of negative potential sources and combinations of sets of positive and negative potential voltages.

Briefly, according to the invention a DC power supply monitor is provided in the form of a single common monitoring circuit for continuously and simultaneously monitoring each of a plurality of DC voltage sources, and including a voltage divider network connected between two sets of DC voltage input terminals of both positive and negative potential, the voltage divider network being arranged to control the conductivity of two opposite conductivity type semiconductors which are normally slightly above cut-off and in the conductive state. Out-of-tolerance change of a monitored voltage effects cut-off of one of the two semiconductors which in turn effect the change of state of an electron-flow responsive device which preferably removes the monitored voltages from their respective loads.

Still other objects, features and attendant advantages will become apparent from a reading of the folowing detailed description of a preferred physical embodiment constructed in accordance with the invention, taken in conjunction with the accompanying drawings wherein:

FIG. 1 is a schematic electrical diagram of a power supply monitor according to the invention.

FIG. 2 is a further adaptation of the power supply monitor of FIG. 1, and illustrating a protective arrangement for removing the voltage sources from their respective loads upon detection of undesired voltage variations.

Referring now in detail to the figures of the drawings, in the power supply monitor arrangement of FIG. 1, a voltage divider network 11, 13, 15 is connected to the voltage supply sources desired to be monitored, in the form of two sets of voltages, one set $V_1$–$V_4$ being positive and the other $V_5$–$V_8$ being negative. The voltages $V_1$, $V_2$, $V_3$, $V_4$ of the positive set are connected to terminals $T_1$, $T_2$, $T_3$, $T_4$ respectively, while the negative DC voltage sources are connected respectively to terminals $T_5$, $T_6$, $T_7$, and $T_8$. Terminals $T_1$–$T_4$ are connected in parallel through corresponding impedances in the form of parallel resistors $R_1$, $R_2$, $R_3$, and $R_4$, to a common junction point A, while terminals $T_5$–$T_8$ are connected in parallel respectively through resistors R5, R6, R7, and R8 to a common junction point B. The impedance means 13 between the points A and B is common to all terminals $T_1$–$T_8$, and takes the form of a sensitivity adjustment rheostat R9 in parallel with a balance potentiometer R10, the parallel resistors R9 and R10 being connected in series with and between voltage dropping diodes CR1 and CR2 which in turn are connected respectively to junction points A and B.

Opposite conductivity type semiconductors in the form of NPN transistor Q1 and PNP transistor Q2 are serially connected through their respective emitter leads, and the junction thereof is connected to the wiper of the balance potentiometer R10, which wiper is clamped to ground. Transistors Q1 and Q2 are connected in controlled relation to junctions A and B respectively by current limiting resistors R11 and R12 which connect respectively between junction A and the base of Q1 on the one hand and junction B and the base of Q2 on the other hand.

Voltage dropping diodes CR1 and CR2 are connected in series with parallel resistors R9–R10, and serve to enable the achievement of the requisite total voltage drop between junctions A and B for normally conducting biasing of transistors Q1 and Q2, while permitting R9–R10 to be of smaller value than otherwise, so as to increase the sensitivity of the system by causing junctions A and B to more closely follow one another in voltage change than would be effected with a larger value of R9–R10 as would be required without CR1 and CR2.

Transistors Q1 and Q2 are in turn connected in cascade controlling relation with opposite conductivity type serially connected semiconductor devices in the form of PNP transistor Q3 and NPN transistor Q4. This cascade connection includes current limit resistor R13 and biasing resistor R14 for transistors Q3 and current limiting resistor R15 and biasing resistor R16, current limiting resistor R13 being connected between the collector of Q1 and the base of Q3, with R14 being connected across the emitter and base of Q3, while R15 and R16 are likewise connected respectively between the collector of Q2 and the base of Q4 and across the base and emitter of Q4.

Serially connected between the collectors of transistors Q3 and Q4 are the coil of a relay K1 and a voltage dropping device which is preferably a threshold voltage limiting control device which may suitably take the form of a Zener diode CR3. Relay K1 may have any desired quantity of contacts for effecting a desired operation as a function of energization or deenergization of the coil of relay K1, being illustrated with a single contact $K1_a$ which serves to remove the voltage sources from their associated loads, as will be further described hereinafter.

Two of the voltages, a positive voltage such as $V_1$, and a negative voltage such as $V_8$, are selected for operation of the transistors Q1, Q2, Q3, and Q4 and the associated relay K1 and Zener diode CR3. The Zener diode CR3 is selected to have a threshold voltage control value compensating for the excess voltage difference between $V_1$ and $V_8$ relative to the sum of the voltage drops across transistors Q3 and Q4 and coil of the relay K1 when transistors Q3 and Q4 are substantially fully conducting and the relay K1 is energized, so as to prevent burn-out of the coil of relay K1 in the event that the difference between he selected voltages $V_1$ and $V_8$ are substantially greater than the normally fully conducting voltage drops across Q3 and Q4 and the coil of relay K1. Zener diode CR3 also serves in this arrangement to provide the desirable feature of a clean pull-in and drop-out of the relay K1.

In operation, for given voltages $V_1$–$V_8$, the values of resistors R1–R8 are selected such that the current through points A and B and the common impedances are the same. In the event that the same number of positive and negative supplies are to be monitored as in the illustration, the resistors R1–R8 are chosen so that the current through each of these resistors R1–R8 will all be the same, assuming that the same percentage of tolerance is permitted for variation of each of the voltage levels $V_1$–$V_8$. If different tolerance percentage ranges are desired for any one or more of the voltage sources, the ratio of the resistors to their respective voltage sources may be varied to provide for greater or lesser relative current flow through that leg of the corresponding parallel impedance network 11 or 15, relative to the variation in current flow for given voltage changes at the other associated input terminals of these networks, so long as the resistors in both networks 11 and 15 are selected in total to provide equal current through both points A and B.

Due to the current flow through resistors R1–R8, a voltage is developed across the common impedance means 13, including CR1, R9, R10, and CR2. Rheostat R9 is adjusted to provide a total voltage drop between points A and B sufficient to bias transistors Q1 and Q2 into a low conducting state slightly above cut-off. The sensitivity of the monitor is determined by this adjustment of rheostat R9, and more or less sensitivity may be achieved by lesser or greater biasing of transistors Q1 and Q2 above their cut-off points, the sensitivity being enhanced by making the effective value of R9 quite small relative to resistors R1–R8 and by use of voltage dropping diodes CR1 and CR2. The wiper contact of potentiometer R10 is adjusted to provide an equal bias on each of the bases of transistors Q1 and Q2, and accordingly it will be apparent that decrease toward zero of either of the points A or B will be effective to cut-off the associated transistor Q1 or Q2. In the normal operating condition of the arrangement in which the voltages $V_1$–$V_8$ are within their operating tolerance ranges, Q1 and Q2 will be conducting, and Q3 and Q4 will also be biased into full conduction, with relay K1 energized and its contact arm $K1_a$ closed.

If all or any of the positive voltages $V_1$–$V_4$ decrease toward zero by a small amount, dependent at each terminal $T_1$–$T_4$ upon the value of the respective resistors R1–R4 and the sensitivity setting of variable resistor R9, the transistor Q1 will be cut-off as a result of decrease of the voltage at junction A, thereby effecting cut-off of transistor Q3 and de-energization of relay K1, whereupon contact $K1_a$ will drop out. Also, by the same token, negative increase of any of the negative voltages $V_5$–$V_8$ away from ground will not only cause heavier conduction of transistor Q2, but will correspondingly move the voltage level at junction A negatively to effect cut-off of transistor Q1, with the same resulting drop-out of contact $K1_a$ as described above.

In the event that any one or all of positive voltages $V_1$–$V_4$ increase beyond their tolerance levels the junctions A and B will be raised positively in potential, and transistor Q2 will be correspondingly cut-off, likewise resulting in cut-off of transistor Q4 and de-energization of relay K1.

In the instance where any of the voltages $V_1$–$V_4$ or $V_5$–$V_8$ decreases toward ground beyond its set tolerance level, the corresponding transistor Q1 or Q2 will be biased to cut-off as a result of decrease of the voltage level at the points A or B, and if both positive voltages $V_1$–$V_4$ and negative voltages $V_5$–$V_8$ decrease toward zero then both transistors Q1 and Q2 will be cut-off, thereby cutting off both control transistors Q3 and Q4 and de-energizing relay K1. The arrangement is thus effective in all instances of variation of the voltage level of the positive and negative voltages $V_1$–$V_8$, except for a rare and normally unencountered condition where one or more voltages in each of sets $V_1$–$V_4$ and $V_5$–$V_8$ simultaneously increase in absolute value relative to ground at the same rate so as to simultaneously increase the absolute values of positive and negative potential at both junctions A and B. In such event the base of Q1 will be made more positive and the base of Q2 will be made more negative, thereby maintaining both transistors Q1 and Q2 in conduction. However, it will be apparent that this is a highly unlikely occurrence, and may for substantially all practical purposes be ignored in operation.

The relay K1 may be employed to accomplish any desired operation as a function of the detection of the undesired change of voltage level at terminals $T_1$–$T_8$, and is preferably arranged to disconnect the voltage supply sources $V_1$–$V_8$ from their respective loads V1Load–V8Load, as shown in FIG. 2. In this arrangement, the contact $K1_a$ controls the connection of a desired or necessary plurality of relay coils K2, K3, K4, and K5 to a suitable power supply source R therefor, which may suitably be one of the monitored supplies $V_1$–$V_8$. In the normally conducting state of relay K1, and contact $K1_a$ is closed, and relays K2, K3, K4, and K5 are energized, resulting in connection of the monitored power supply voltages $V_1$–$V_8$ to their respective loads V1Load–V8Load, through closure of the corresponding relay contacts $K3_{a-c}$, $K4_{a-c}$, and $K5_{a-b}$. It will be apparent that more or less relays K3–K5 may be employed as desired, with more or less contacts, the present illustration of three relays and eight associated contacts being for illustrative purposes only. It will also be apparent that the single relay K1 might itself be employed with a number of contacts for effecting this connection and disconnection of the voltage sources to their respective loads. However, it is desirable to provide a time delay means for preventing re-energization of the relays K3–K5 after detection of an undesired voltage change and resultant de-energization of the relay K1. This is due to the possibility that the detected change in voltage level may be due to a short in one or more of the loads V1Load–V8Load, which would result in immediate re-energization of the relay K1 upon removal of the defective load from the associated voltage supply source, with consequent chattering of the relay K1 and other associated controlled relays. To this end, the circuit includes a time delay pull-in relay K2 with an associated normally open power application control contact $K2_a$ which prevents immediate re-energization of the relays K3–K5 after drop-out of relay K1 and these associated relays K2–K5.

While the invention has been illustrated and described with respect to a single preferred illustrative embodiment, it will be readily apparent to those skilled in the art that various embodiments and modifications may be made without departing from the scope and spirit of the invention. For instance, in lieu of the relay K1, in the event that removal of the voltage sources from their loads is not necessary or desired for satisfactory operation upon variation of one or more of the voltage sources, an indicator may be employed in lieu of the relay K1, such as an indicator lamp, a buzzer, or the like, or such may be added in addition to the relay K1 in series or parallel relation with the coil thereof. Also K1 may be replaced by a power transistor or an SCR if desired, to increase the speed of operation. In addition, while the arrangement is particularly desirable for monitoring both positive and negative voltages, it will be apparent that the monitored voltages may all be either all positive or all negative. For instance, if $-V_8$ is made ground, R8 is made small and R5, R6, and R7 are removed, and the ground connection between Q1 and Q2 is made a suitable positive value, the circuit will effectively monitor a selected number of positive voltages $V_1$–$V_4$ without any negative voltages. It will accordingly be understood that the invention is not to be limited by the illustrative embodiment, but only by the scope of the appended claims.

That which is claimed is:

1. A power supply monitor comprising:
   a single common monitoring circuit for continuously and simultaneously monitoring each of a plurality of DC voltage sources and
   including a plurality of DC voltage input terminals,
   common voltage sensing means for all of said terminals and common electron flow responsive means actuated by said voltage sensing means as a function of change of voltage level at any one of said input terminals,
   said common voltage sensing means including two oppositely biased electron flow control sections both normally biased by voltage applied at said input terminals into a first common conductive state when said input terminals are at their respective desired potential levels,
   said electron flow control sections being responsive to out-of-tolerance change of voltage level at any one or all of said input terminals and being changed in operating state to a second opposite conductive state as a function of said change of voltage level.

2. A power supply monitor comprising:
   a single common monitoring circuit for continuously and simultaneously monitoring each of a plurality of DC voltage sources, and
   including a plurality of DC voltage input terminals,
   common voltage sensing means for all of said terminals and common electron flow responsive means actuated by said voltage sensing means as a function of change of voltage level at any one of said input terminals,
   said common voltage sensing means including two oppositely biased electron flow control devices both normally biased by voltage applied at said input terminals into a first common conductive state when said input terminals are at their respective desired potential levels,
   said electron flow control devices being responsive to out-of-tolerance change of voltage level at any one or all of said input terminals and being changed in operating state to a second opposite conductive state as a function of said change of voltage level.

3. A power supply monitor according to claim 2,
   said oppositely biased electron flow control devices being normally biased into conduction and being a pair of opposite conductivity type semiconductor devices normally biased into conduction as a function of presence of desired voltage levels at said input terminals.

4. power supply monitor according to claim 3,
   said opposite conductivity type semiconductor devices having oppositely poled control electrodes connected across common impedance means in series circuit relation with said input terminals.

5. A power supply monitor according to claim 4,
   said opposite conductivity type semiconductor devices being serially conducted NPN and PNP transistors having their respective bases connected at different voltage potential points along said common impedance means.

6. A power supply monitor according to claim 5,
   the collector of one of said transistors being operatively connected with the emitter of the other of said transistors at a common junction,
   said common junction being operatively connected in balancing biased relation to a selected point along said common impedance means, and
   means operatively connecting said junction to ground.

7. A power supply monitor according to claim 4,
   said common impedance means comprising a selectively variable first impedance for variation of sensitivity of said transistors by variation of total bias potential between said bases, and
   a second impedance connected in parallel with said first impedance and being a balance resistor having an adjustable wiper contact operatively connected to said common junction between said semiconductor devices.

8. A power supply monitor according to claim 7,
   and a voltage divider network arranged in bias controlling relation to said bases of said semiconductor devices,
   said network including individual current controlling impedances respectively connected in series relation between each of said input terminals and said two parallel impedances.

9. A power supply monitor according to claim 8,
   a plurality of said current controlling impedances being in mutual parallel circuit relation and having a common junction in series relation with said parallel sensitivity and balance adjustment impedances.

10. A power supply monitor according to claim 9,
    including two sets of said current controlling impedances connected in mutual parallel relation within each set and being connected respectively between a first set of said input terminals for connection to a corresponding set of positive potential sources and a second set of said input terminals for connection to a corresponding set of negative potential sources.

11. A power supply monitor according to claim 10,
    and third and fourth electron flow control devices having control electrodes,
    each of said latter control electrodes being operatively connected to and in controlled relation by the output of a respective one of said opposite conductivity type semiconductor devices,
    said electron flow responsive means being serially connected with and between said third and fourth current control devices.

12. A power supply monitor according to claim 11,
    and a threshold voltage limiting device in series relation with and between said third and fourth electron flow control devices.

13. A power supply monitor according to claim 12,
    said threshold voltage limiting control device comprising a Zener diode, and
    said third and fourth electron flow control devices comprising opposite conductivity type semiconductor devices,
    said common impedance means further including two voltage dropping diodes connected serially with and each respectively on an opposite end of said paralleled first and second impedances.

14. A power supply monitor according to claim 12,
    and including a protective arrangement wherein
    said electron flow responsive means comprises a relay arranged in controlling relation to the application of power to said input terminals.

15. A power supply monitor and protective arrangement according to claim 14, at least one of said input terminals being connected in power supplying relation to said electron flow control devices and said electron flow responsive means.

16. A power supply monitor according to claim 2, and a voltage divider network arranged in current flow controlling relation to said electron flow control devices, said network including individual current controlling impedances respectively connected in series relation between each of said input terminals and respective control points for said electron flow control devices.

17. A power supply monitor according to claim 16, a plurality of said current controlling impedances being connected in mutual parallel circuit relation and having a common junction point, and further impedance means in series circuit relation with said common junction point, said electron flow control devices being connected in electron flow controlled relation across said further impedance means.

18. A power supply monitor according to claim 17, including two parallel sets of said current controlling impedances connected respectively between a first set of said input terminals for connection to a corresponding set of positive potential sources, and a second set of said input terminals for connection to a corresponding set of negative potential sources, each of said sets of parallel impedances having a respective common junction, said further impedance means being connected in series relation with and between said two common junctions.

19. A power supply monitor comprising:
a single common monitoring circuit for continuously and simultaneously monitoring each of a plurality of DC voltage sources, and including a plurality of DC voltage input terminals, common voltage sensing means for all of said terminals and common electron flow responsive means actuated by said voltage sensing means as a function of change of voltage level in either increasing or decreasing direction at any one of said input terminals.

20. Apparatus according to claim 19, said plurality of DC voltage input terminals including both positive and negative input terminals and being arranged in individually unpaired and jointly sensed interconnected relationship.

21. A power supply monitor comprising:
a single common monitoring circuit for continuously and simultaneously monitoring each of a plurality of DC voltage sources, and including a plurality of DC voltage input terminals in individually unpaired and jointly sensed interconnected relationship, common voltage sensing means for all of said terminals and common electron flow responsive means actuated by said voltage sensing means as a function of change of voltage level at any one of said input terminals.

22. Apparatus according to claim 21, said plurality of DC voltage input terminals including both positive and negative input terminals.

References Cited

UNITED STATES PATENTS

| | | | |
|---|---|---|---|
| 3,167,685 | 1/1965 | Bade | 317—123 |
| 3,270,212 | 8/1966 | Daigle et al. | 328—148 |

JAMES D. TRAMMELL, Primary Examiner

U.S. Cl. X.R.

317—33, 148.5